United States Patent [19]

Hochmuth

[11] 3,910,722

[45] Oct. 7, 1975

[54] PORTABLE IRRIGATION PUMP

[76] Inventor: Joseph W. Hochmuth, P.O. Box 22, Roundup, Mont. 59072

[22] Filed: Apr. 26, 1973

[21] Appl. No.: 327,114

[52] U.S. Cl. .................................. 417/34; 417/231
[51] Int. Cl.² .......................................... F04B 49/06
[58] Field of Search .......... 61/12; 417/34, 231, 234, 417/20, 25, 38, 43; 415/142

[56] References Cited
UNITED STATES PATENTS

| | | | |
|---|---|---|---|
| 2,214,677 | 9/1940 | North | 417/231 |
| 2,664,052 | 12/1953 | Schmidt | 417/234 |
| 3,008,422 | 11/1961 | Crisafulli | 417/234 |
| 3,253,357 | 5/1966 | Allard | 417/234 |
| 3,263,615 | 8/1966 | Hofer | 417/279 |
| 3,424,883 | 1/1969 | Heshett | 417/38 |
| 3,490,380 | 1/1970 | Beckett | 417/234 |

*Primary Examiner*—C. J. Husar
*Assistant Examiner*—O. T. Sessions

[57] ABSTRACT

An irrigation pump hingedly attached by arms to a portable frame which supports a motor for power, a saddle for the pump to rest in and a boom, cable and winch for raising and lowering of the pump and all made towable by means of a tongue.

1 Claim, 8 Drawing Figures

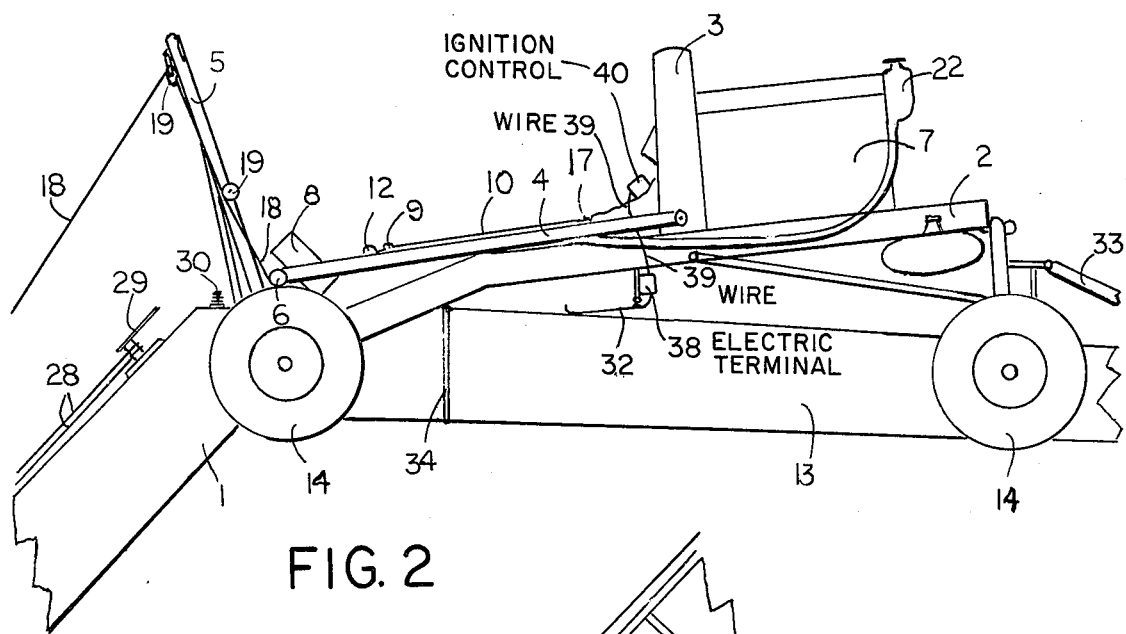
FIG. 2
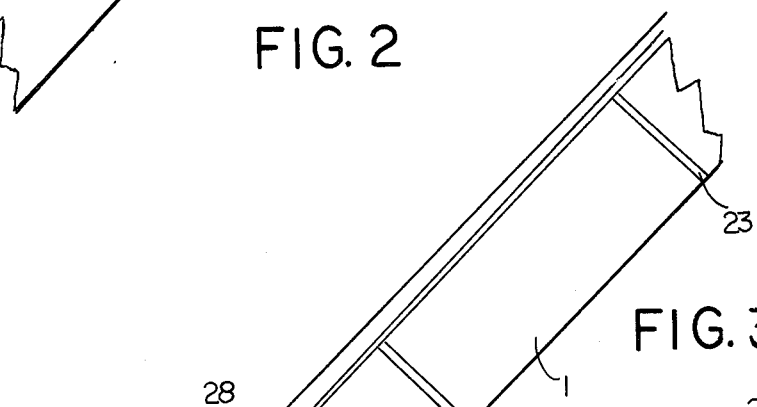
FIG. 3
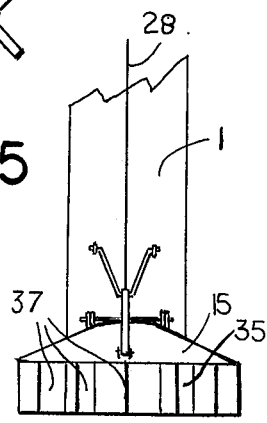
FIG. 5
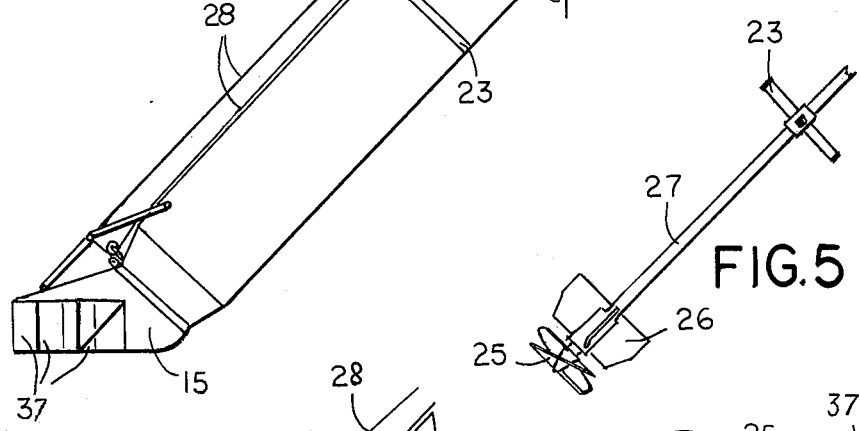
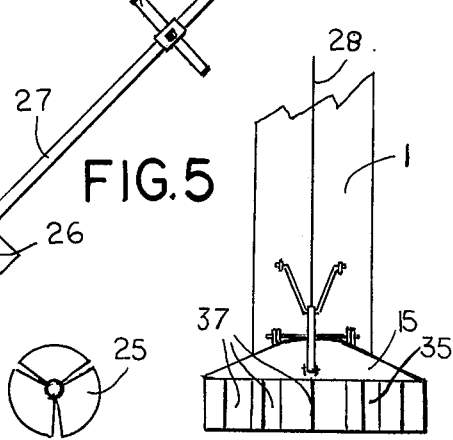
FIG. 6  FIG. 7
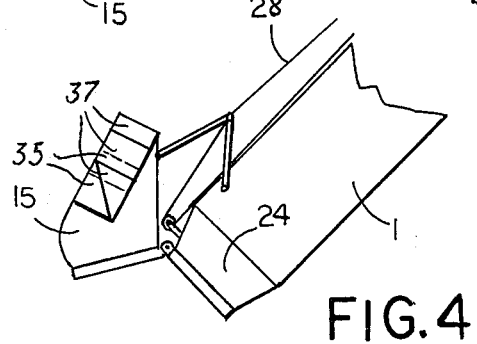
FIG. 4

PORTABLE IRRIGATION PUMP

This invention relates to a water pump, more particularily to a portable irrigation pump.

The object of the invention is to provide a portable pump that can be quickly set along a river or water supply, with either sloping or vertical banks, and pump can be lowered into the water so as to pump the water up on to the field or into a ditch.

One advantage is that it is a light-weight, high-volume pump that will irrigate a large number of acres at a time.

Another advantage is that for transporting, the pump is swung up and over the motor, to rest in a saddle making it easy to secure and maneuver around to all places.

Still another advantage is that when the pump is set down in pumping position, it sets or lies on the ground and does not lift water any higher than needed.

Still another advantage is that it is easily raised and lowered with a winch and can quickly be moved from one setting or field to another.

Still another advantage is that it can be set in very shallow water due to the design of the intake scoop.

Still another advantage is that sand and gravel does not impede operation of pump.

Another advantage is that should a new water site be too shallow to permit the intake scoop to be completely submerged, the scoop can be swung up. This permits the pump impeller to churn the mud or gravel, expell it and create a hole large enough to submerge the intake scoop. This permits positioning for pumping.

FIG. 2 is a side view of the pump when it is set down in pumping position.

FIG. 3 is a side view of the lower half of pump with the intake scoop down in position.

FIG. 4 is a side view of the lower end of pump with the intake scoop swung up.

FIG. 5 is a side view of the pump's impeller, fin-bearing holders and drive shaft.

FIG. 6 is an end view of impeller.

FIG. 7 is an end view of the lower end of pump and intake scoop.

Figure 1:
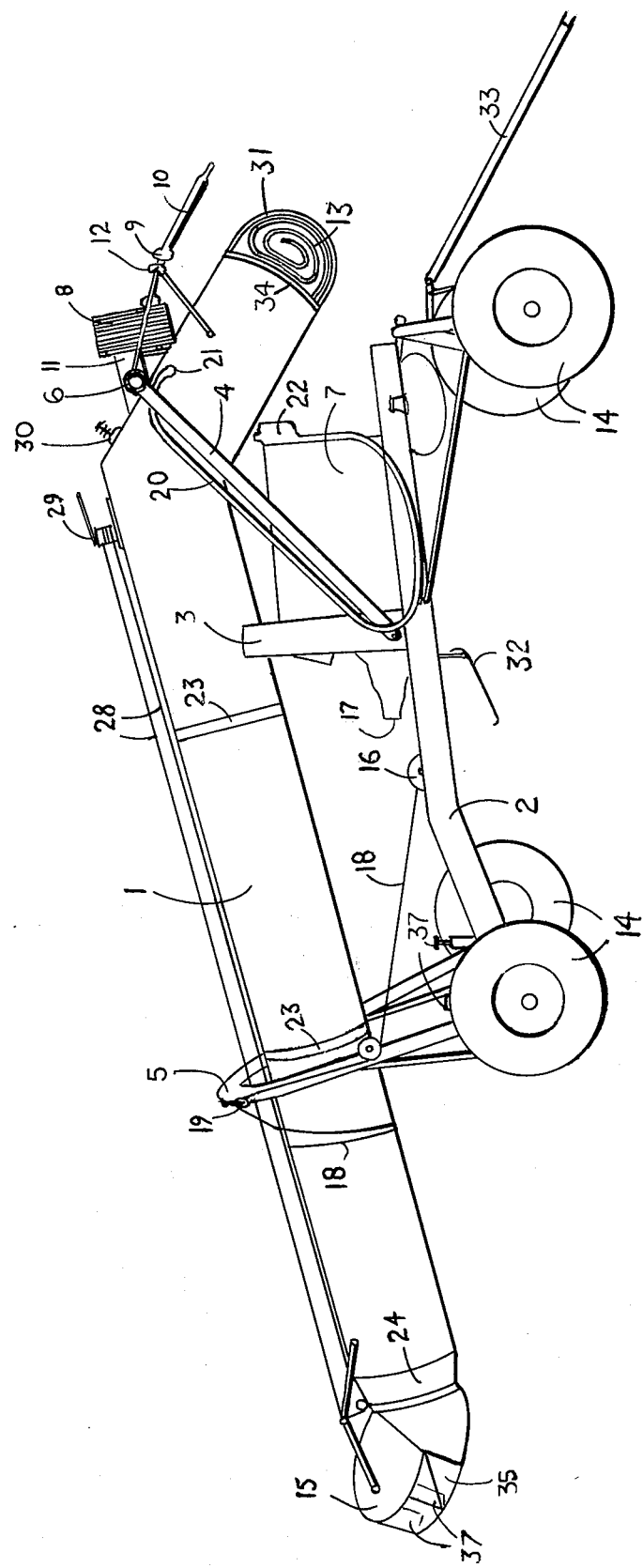
FIG. 1 is a side view of the pump when it is raised up in transport position.
Figure 8:
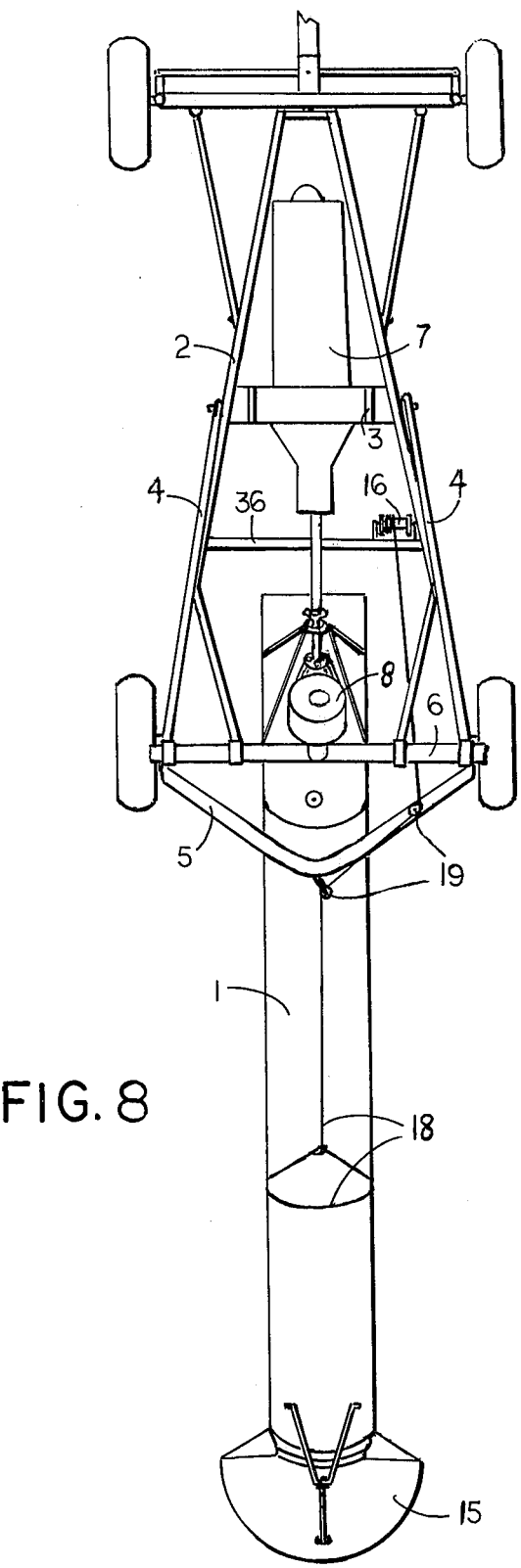
FIG. 8 is a top plain view of the pump when set down in pumping position.

Referring to the drawing, a portable irrigation pump made in accordance with the present invention is shown to include a pump 1 which is a big tube having two bearing supports 23 mounted in it with a shaft 27 extending through the center. On lower end of pump is a bearing support with fins 26. On end of shaft 27 is impeller 25 which is incased by a cone-shaped housing 24. The intake scoop 15 which is attached to the housing by a hinged bracket and held down by hinging braces, has a cable 28 attached. This is adjusted by a hand winch 29 on upper end of pump 1. On upper end of the pump is an elbow built into the tube with a pump support hinge 6 and carrier bearing 11. Mounted on the outer upperend, with shaft 27 extending through and on the end of it is a reduction drive 8. This drive is coupled to engine or power source 7 by means of universal joints 9 and driveshaft 10. The drive is held in line with bearing and braces 12. Spline 17 is for coupling driveshaft 10 to engine 7. There are two hinge-support arms 4 which are braced from top hinge. They are collars that encircle a pipe which is the pump support hinge 6.

At the bottom end of hinge support arm 4 they hinge on lower end of saddle frame 3 which is mounted on frame 2 and carried on four wheels 14. The apparatus is pulled and guided by steering mechanism and tongue 33. Saddle 3 is curved to the shape of the pump. Boom 5 extends up from the rear end of frame 2 supporting pulleys 19. Cable 18 extends from lower half of pump 1 over pulleys 19 to winch 16, for raising and lowering said pump. Hose 20 is to transfer coolant fluid from engine reservoir 22 to radiator 21. Radiator is mounted inside of pump. Irrigation hose 13 is a large, light-weight hose, which is attached by clamp 34. When rolled up in transport position it is held in place with hose carrier 31. This is a small flexible strap, held on by clamp 34, that can be swung out of the way when hose is to be rolled out on to the field or into the ditch. Valve 30, mounted in top of pump, is large and has a light spring. This alleviates vacuum caused by water leaving the tube when pump is stopped. This prevents the hose from being sucked into pump. Shutoff arm 32 is hinged on a bracket that extends downward below frame so the end of the arm can lay on hose. When hose is full, arm is held up; when the hose lowers, arm drops and upper end grounds an electric terminal 38 which is connected by wire 39 to an ignition control 40 which automatically shuts off power source. Intake ports 35 are in the outer circular edge of the intake scoop, permitting a large volume intake. Cross member 36 and boom 5 help to form a wishbone-type of frame, so as to permit pump to be set down between back wheels. Antiswire fins 37 are mounted in intake scoop 15, to stop the swirling of the water and to brace the scoop.

Now to explain the operation of this invention; the pump is towed to the irrigation site, backed up to the river or source of water supply. By operating a switch, the winch 16 extends cable 18 lowering intake end of pump 1 causing support arms 4 to hinge on frame. This action lifts discharge end of pump 1 up off of saddle 3, back and down to pumping position with pump support hinge 6 resting on adjustable seats 37 and intake scoop 15 submerged in water and resting on river bank. Then the power shaft 10 is coupled to power output 17 on end of engine 7. The hose 13 is unrolled and the pump is ready to be started. When hose is filled with water, shutoff arm 32 is lowered on to hose 13. If flow of water drops in case of trouble, shutoff arm 32 lowers, causing the other end of arm to touch an electric terminal 38 grounding ignition control 40 which stops the engine. Should mud or gravel be washed into the old pumping site or the water level drops too low to enter pump, then hand lever winch 29 is turned. Cable 28 pulls up on intake scoop 15, which is hinge-mounted to pump impeller housing 24. This swings the intake scoop up and out of the way to permit the impeller housing 24 to settle down into the mud or gravel. If any water can flow into the pump, starting and stopping it a few times will wash out a hole big enough for the intake scoop to swing down in to position and be submerged in water. For raising the pump, the procedure is just the opposite. First, the hose 13 is rolled up and hose holders 31 are pulled around the hose 13 to retain it. Then the power shaft 10 is disconnected, the switch on the winch 16 is manipulated and the winch retracts the cable 28 which pulls up under pump support hinge 6 and on lower end of pump 1. This causes support arms 4 to hinge on pump support hinge 6 and on frame 2, which lifts the discharge end of pump 1 up and over engine 7 to rest in saddle 3. Pump is ready to be towed to next site.

Now to present which is claimed as new and my own invention, to be protected by Letters Patent of the United States is:

1. A portable irrigation pump comprising a frame supported by wheels adaptable for transport; a cross-member in the middle of said frame to form an A-shaped wishbone-type support; a saddle vertically mounted above each side of said frame and horizontally connected above a power source to form a transportable rest for the upper end of pump to set in; a pair of support arms hingedly mounted on each side of saddle and frame, upper end of said support arms hingedly and bracedly attached to a pump support hinge to lift pump head up out of saddle and hingedly set it down into the wishbone end of frame; said pump support hinge being fixedly mounted to upper end of pump; a winch fixedly mounted to frame; from said winch a cable extendable under said pump support hinge up to boom which extends upwardly and rearwardly from frame and said cable extending downwardly to lower part of pump; said power source securely mounted in said frame with a coupleable, turnable, flexible, reduceable drive train extending rearwardly connecting to pump shaft which is supported by a thrust bearing on said pump support hinge and which extends in and through the center of an elongated tubular conduit with an impeller fixedly mounted on opposite end of shaft and rotatable in a cone-shaped housing, said impeller held in position by a fin-support bearing, thus forming the pump; an intake scoop with shallow 180-degree circular intake ports with Antiswire fins mounted and spaced to brace the scoop, said intake scoop hingedly mounted to said cone-shaped housing and controllable by cable and hand winch which is mounted on upper end of pump; a hose secured by clamp means to upper end of conduit which is a 45° elbow to house a radiator and to permit said hose when inflated to extend out on the ground, or when rolled up, to be held to end of conduit by a flexible, attached by clamp, hose carrier that encircles the hose; an automatic shutoff arm, hingedly attached on a bracket that is mounted on underside of frame, one end of the arm resting on the hose, which is flexible and supported by internal water pressure, so that when the pressure drops, the hose collapses, triggering the arm causing other end to touch an electric terminal which grounds the ignition control, shutting off the power source; and a vent valve, mounted in top of pump, to alleviate vacuum caused by water leaving the tube when the pump is shut off.

* * * * *